A. J. PETERSON.
ATTACHMENT FOR SCREW CUTTING LATHES.
APPLICATION FILED SEPT. 25, 1912.

1,075,301. Patented Oct. 7, 1913.

Witnesses
Byron B. Collings.
Edwin J. Beller.

Inventor
A. J. Peterson.
by Wilkinson, Witherspoon & MacKay
his Attorneys.

UNITED STATES PATENT OFFICE.

ARVID J. PETERSON, OF GREENFIELD, MASSACHUSETTS.

ATTACHMENT FOR SCREW-CUTTING LATHES.

1,075,301.   Specification of Letters Patent.   Patented Oct. 7, 1913.

Application filed September 25, 1912.   Serial No. 722,304.

*To all whom it may concern:*

Be it known that I, ARVID J. PETERSON, a citizen of the United States, residing at Greenfield, in the county of Franklin and State of Massachusetts, have invented certain new and useful Improvements in Attachments for Screw-Cutting Lathes; and I do hereby declare the following to be a full, clear, and exact description of the invention, such as will enable others skilled in the art to which it appertains to make and use the same.

My invention relates to improvements in attachments for screw-cutting lathes, and it consists in the constructions, combinations and arrangements herein described and claimed.

The object of my invention is to provide an improved attachment for screw-cutting lathes, by which the operator can disengage the split lock nut from the lead screw of the lathe and return the tool carriage quickly by hand feed without losing the proper lead.

Figure 1:
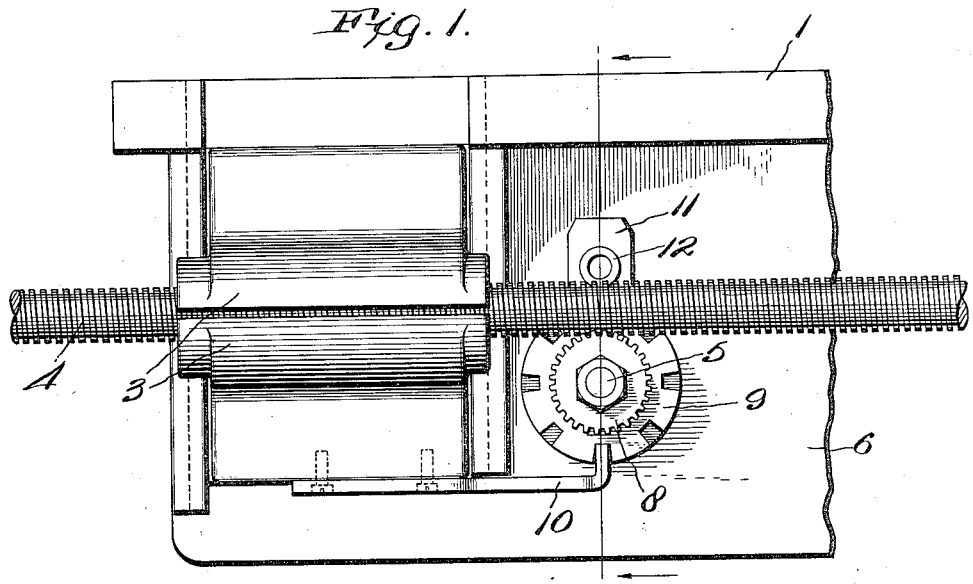
Figure 2:
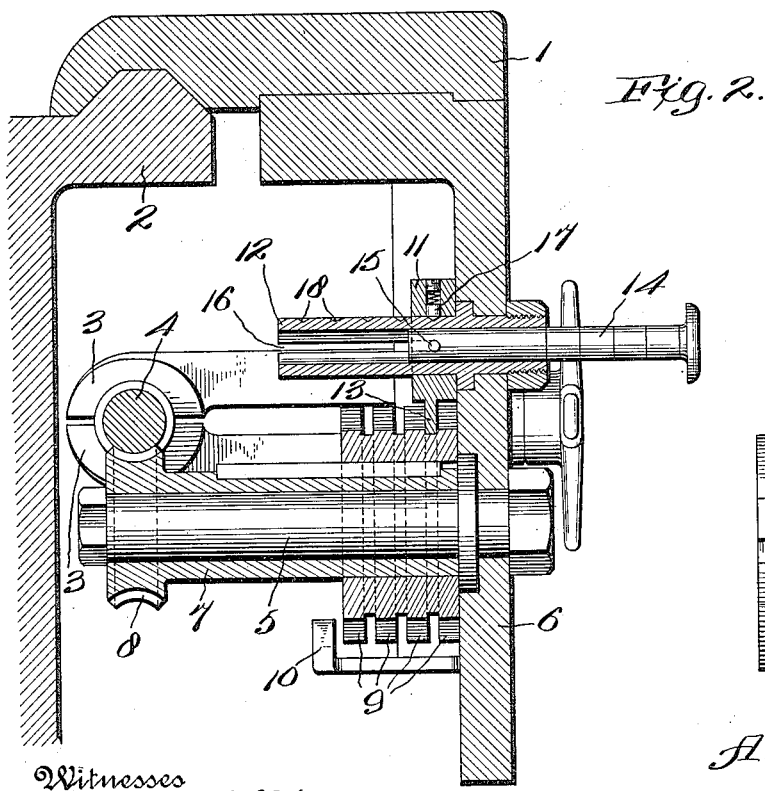
Figure 3:
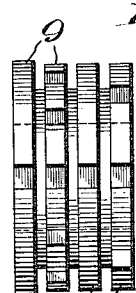

In the accompanying drawings forming a part of this application, and in which similar reference symbols indicate corresponding parts in the several views:—Figure 1 is a fragmentary elevation from the left hand of Fig. 2, illustrating one embodiment of my invention applied to a lathe; the lathe bed being omitted for clearness; Fig. 2 is an enlarged section on the line 2—2 of Fig. 1; and Fig. 3 is an edge view of the notched index disks.

Referring to the drawings, 1 indicates any usual tool carriage slidably mounted on the lathe bed 2; said carriage carrying a split lock nut 3 adapted to be shifted into and out of engagement with the lead screw 4 of the lathe.

A stud 5 secured to the carriage apron 6 rotatably carries a bushing 7 provided with a worm wheel 8 in mesh with the lathe lead screw 4; the pitch of the lead screw being preferably a multiple of the number of teeth on said worm wheel.

A series of notched index disks 9 are slidably splined on the bushing 7 for selective engagement with a finger 10 secured on the lower half of the split lock nut 3. I preferably form the series of disks as an integral part, and find it advantageous to provide the successive disks with eight, four, twelve and two uniformly spaced peripheral notches.

A block 11 is slidably mounted on a sleeve 12 secured to the carriage apron, and provided with a projection 13 extending between two of the disks 9 to position any desired disk for engagement by said finger 10. A plunger 14 is slidably mounted in the sleeve 12 and connected to said block 11 by a pin 15 extending through a slot 16 in said sleeve; a spring-pressed pin 17 being carried by said block 11 for engaging tapered recesses 18 in the sleeve 12, to insure accurate positioning of the notched disks 9 and to yieldingly lock said disks in their several shifted positions.

From the above description, it will be clear that when the lock nut 3 and lead screw 4 are engaged for feeding the lathe carriage, the finger 10 on said lock nut will engage one of the notched disks 9 and lock the bushing 7 and worm wheel 8 against rotation on the stud 5; the worm wheel in this locked position acting merely as a nut which is forced along simultaneously with the nut 3 by rotation of the lead screw.

When the tool cut has been completed, the lock nut 3 is disengaged from the lead screw 4, and the carriage quickly returned by hand feed for starting the next cut. In this returned position of the carriage, the lock nut 3 cannot be again closed into engagement with the lead screw 4 until the carriage is shifted to bring the finger 10 in position for engaging a notch in the index 9; thereby insuring accurate positioning of the carriage for securing proper lead of the screw-cutting tool.

In order to determine the proper index disk to be employed in any particular case, the number of threads to be cut is multiplied by the least number that will give a multiple of the lead screw pitch. For example, if the lead screw has a pitch of six, in cutting a thread of $11\frac{1}{2}$ pitch, we multiply $11\frac{1}{2}$ by 12, which gives a product of 138. Assuming the worm wheel 8 to have twenty-four teeth, then the carriage will be fed forward four notches for each revolution of said worm wheel. Now $\frac{12}{24} \times 4 = 2$, and an index having two diametrically opposite notches should be employed; since the engagement of the finger 10 with either of said notches will insure the proper lead.

I have illustrated and described a preferred and satisfactory construction, but changes could be made within the spirit and scope of my invention.

I claim:—

1. An attachment for screw-cutting lathes comprising a bushing rotatably mounted on the lathe carriage, a worm wheel on said bushing in mesh with the lathe lead screw, a series of differently notched index disks slidably splined on said bushing, a finger on the split lock nut of the lead screw, and means for shifting said several notched disks into position for locking engagement by said finger when the split lock nut is closed in engagement with the lead screw.

2. An attachment for screw-cutting lathes comprising a bushing rotatably mounted on the lathe carriage; connections to the lathe lead screw for rotating said bushing, an integral series of differently notched index disks slidably splined on said bushing, a finger rigidly connected to the split nut of the lead screw, and adjustable means for shifting said series of notched disks to bring any desired disk into position for locking engagement by said finger when the split nut is closed on the lead screw.

3. An attachment for screw-cutting lathes comprising a bushing rotatably mounted on the lathe carriage, connections to the lathe lead screw for rotating said bushing, an integral series of differently notched index disks slidably splined on said bushing, a finger rigidly connected to the split nut of the lead screw, adjustable means for shifting said series of notched disks to bring any desired disk into position for locking engagement by said finger when the split nut is closed on the lead screw, and automatic means for accurately positioning said notched disks and locking the latter in their several adjusted positions.

In testimony whereof, I affix my signature, in presence of two witnesses.

ARVID J. PETERSON.

Witnesses:
WILLIAM A. DAVENPORT,
HARRY A. WEYMOTH.

---

Copies of this patent may be obtained for five cents each, by addressing the "Commissioner of Patents, Washington, D. C."